Sept. 5, 1933.   C. E. WILLIAMS   1,925,161
CLUTCH MECHANISM
Filed Aug. 5, 1929
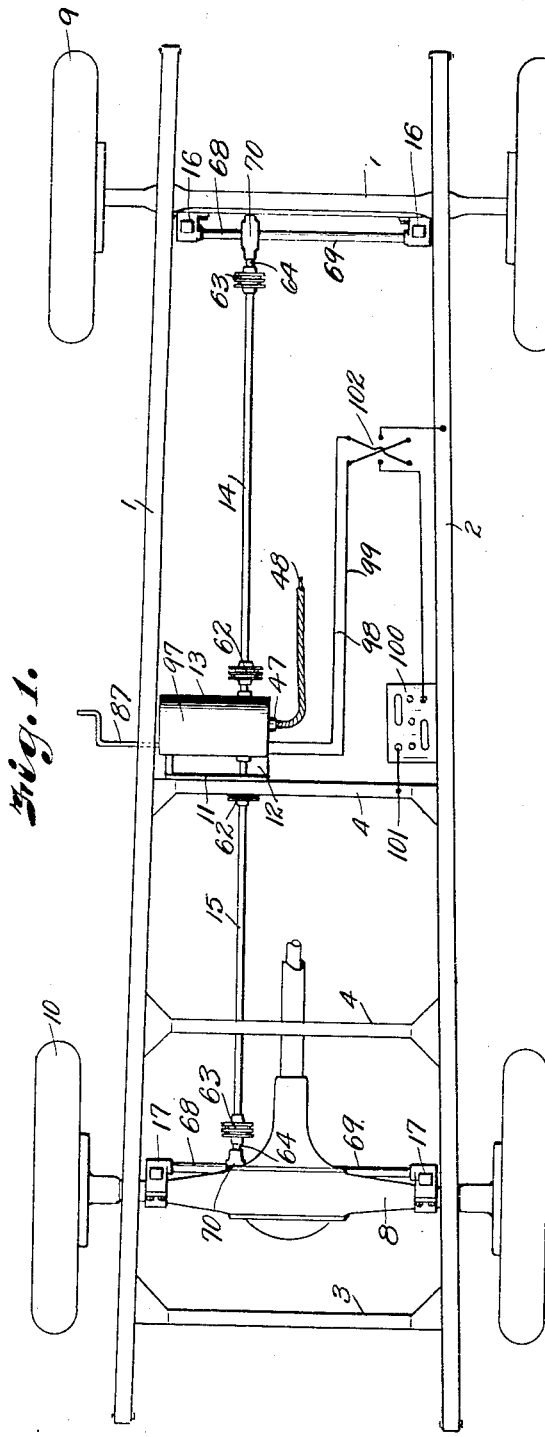
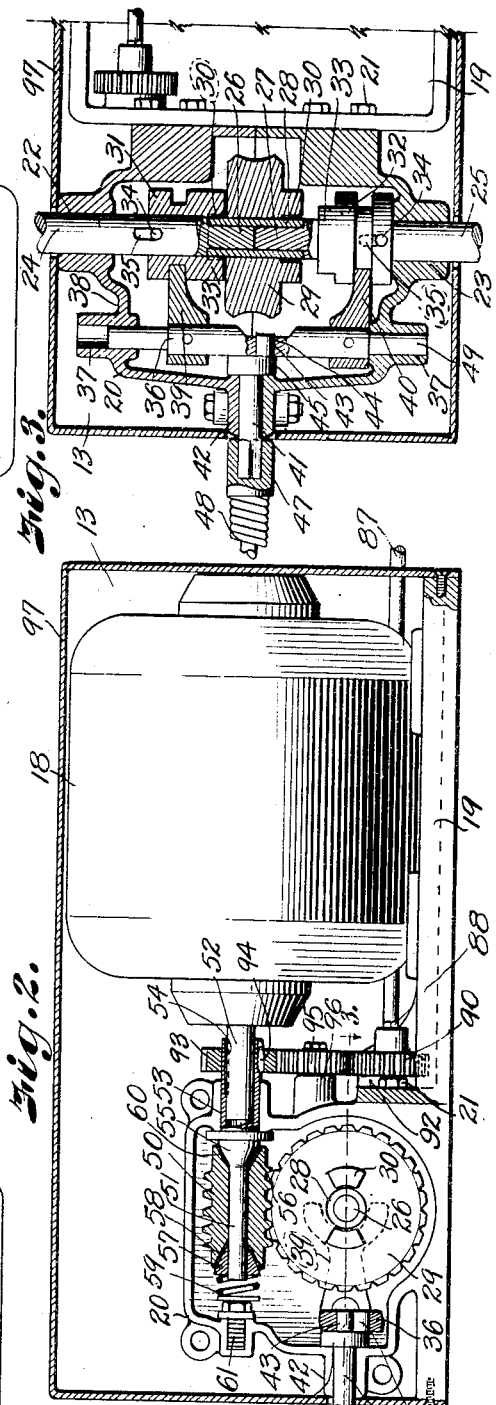
INVENTOR
Clarence E. Williams.
BY
ATTORNEY Patented Sept. 5, 1933

1,925,161

UNITED STATES PATENT OFFICE 1,925,161

CLUTCH MECHANISM

Clarence E. Williams, Chicago, Ill., assignor of one-half to T. B. Watkins, Kansas City, Mo.

Application August 5, 1929. Serial No. 383,591

2 Claims. (Cl. 192—48)

My invention relates to clutch mechanism and has for its principal objects to provide a clutch adapted particularly for selectively controlling operation of a plurality of shafts, as for example, the shafts of individual jacks mounted permanently on a vehicle, and to embody means in the clutch mechanism whereby operation of the jacks may be controlled from the driver's position.

In accomplishing these and other objects of the invention, I have provided improved details of structure, the preferred form of which is illustrated in the accompanying drawing, wherein:

Fig. 1 is a plan view of an automobile chassis equipped with jacks controlled by clutch mechanism constructed in accordance with my invention.

Fig. 2 is a central vertical sectional view of the clutch and transmission unit for operating the jacks.

Fig. 3 is a fragmentary cross-sectional view on the line 3—3, Fig. 2, particularly illustrating the clutch mechanism.

Referring in detail to the drawing:

1 and 2 designates longitudinal channel members of an automobile frame braced by cross-members such as 3 and 4, the frame being mounted by conventional springs on front axles 7 and a rear axle housing 8 carried by wheels 9 and 10 respectively.

Secured to the frame channels and to the cross member 4 is a supporting bracket 11 having a laterally extending shelf 12 for supporting a power transmitting unit 13 operably connected through shafts 14 and 15 with front and rear jacks 16 and 17 respectively, as will be later described.

The power transmitting unit 13 includes a motor 18 mounted on a base 19 and operably connected as later described, with a worm gear drive and shifting mechanism contained in a housing or frame 20 secured to the motor base by bolts such as 21.

The housing 20 is preferably divided on a central transverse line to permit assembly of the shifting apparatus and includes spaced aligning bearing openings 22 and 23 wherein inner end sections 24 and 25 of drive shafts 15 and 14 are journaled. The drive shaft sections are provided with reduced inner and abutting adjacent ends 26 and 27 for engaging a sleeve 28 fixed concentrically in a worm gear 29 provided on both sides with clutch jaws 30.

Slidably mounted on the shaft sections 24 and 25 are clutch collars 31 and 32 respectively having jaws 33 for interlocking with the jaws on the worm gear. The collars are keyed to the shaft sections against rotation by pins such as 34 engaging in longitudinal elongated slots 35 in the shafts.

Means for selectively engaging the clutch collars with the worm gear 29 includes a bar 36 slidably supported in bearing openings 37 in opposite wall portions 38 of the housing 20, and shifting arms or yokes 39 and 40 keyed to the bar and engaged respectively with the clutch collars 31 and 32, whereby shifting of the bar will move the collars on the shafts 24 and 25 into and out of engagement with the corresponding clutch jaws of the worm gear.

A rocking stub shaft 41 rotatably mounted in a bearing boss 42 comprising an apertured portion of the housing 20 is provided with a pin 43 extending therefrom inwardly of the housing and eccentrically to the axis of the shaft, and located in an enlarged slot 44 of the bar 36, whereby rotative movement of the shaft 41 will effect shifting of the bar to engage one or the other clutch collar with the corresponding clutch jaw.

The pin 43 is preferably mounted eccentrically on a disk 45 fixed concentrically on the end of the shaft 41. The outer end of the shaft protrudes from the housing, and is made non-circular to receive a socket member 47 adapted for rotative operation through a flexible shaft 48 for operating the shifting bar. The flexible shaft may extend to a suitable position, for example to a disk, for facilitating operation of the shifting mechanism.

The yokes 39 and 40 are spaced from each other and from the ends of the bar sufficiently to permit reciprocation of the bar, the yokes being so located that they respectively serve as stop members to limit the sliding movement of the bar into each retracted position, and the bar preferably having reduced journal or trunnion portions 49 forming stop shoulders with which the outer or stop faces of the yokes register.

A worm 50 meshed with the worm gear is slidably and rotatably sleeved on a shaft 51 aligned with the extended motor shaft 52. A sleeve 53 fixed to the inner end of the shaft 51 and comprising a longitudinal extension of the shaft receives the motor shaft and is keyed thereto by a spline 54 so that the motor may rotate the worm shaft.

The inner end of the worm shaft is expanded to form a conical portion 55, to receive the conically recessed inner end 56 of the worm, and a conical member 57 slidable on the opposite end of the shaft is urged into frictional engagement with the conically recessed outer end 58 of the worm by an expansion spring 59. The spring-pressed cone member 57 tends therefore to force the worm along the shaft into engagement with the conical portion of the shaft, to establish driving relation between the motor and the worm gear, but the worm shaft may slip over the bore of the worm under excessive resistance offered by the gear to prevent hazardous strain on elements of the mechanism and similar undesirable results.

Friction lining 60 is interposed in the conical sockets of the worm between the faces of the sockets and the faces of the cones. A bolt 61 threaded in the housing 20 serves as an anchor for the spring and may be adjusted for varying the pressure of the cone member 57 against the worm, and the tightness of the frictional engagement of the worm with the worm shaft.

The inner end sections 24 and 25 of the shafts 15 and 14 are connected therewith by universal joints 62, the shafts being aligned, and their outer ends being connected by universal joints 63 with outer shaft sections 64. The shaft sections 64 in turn are operably connected to the jacks 16 and 17 by shaft ends 68 and 69 through suitable gearing enclosed in housing 70.

Attention is recalled to the worm gear operating mechanism, and particularly to Figs. 1 and 2, wherein manual means is illustrated for operating the jacks.

A hand crank 87 has a squared inner end 88 (Fig. 2) adapted to be received in the squared axial socket of a gear 90 rotatably mounted on a suitable pin or stud fixed in a bracket-like exterior boss 92 of the housing 20. A pinion 93 is keyed by a spline 94 to the sleeve 53 in vertical alignment with the gear 90, and is operable thereby through an idler gear 95 rotatably mounted on a boss 96 projecting from the housing 20.

A case or cover 97 mounted over the motor and housing 20, and secured to the base 19, is provided with suitable apertures and bearing openings to admit the stub shaft 41, shaft sections 24 and 25, and manually operable shaft 87, to the jack-controlling elements.

The motor which is of the reversible type, is energized through circuit wires 98 and 99 connected with a battery 100 grounded in the frame at 101, the current being controlled through a reversing switch 102 which may be constructed and connected to the circuits in the ordinary manner.

In using apparatus constructed and assembled as described, the jacks being in elevated position, the stub shaft 41 is rotated to shift the bar 36 and thereby shift one or the other of the clutch collars 31 and 32 into engagement with the corresponding clutch portion of the worm gear for actuating the front or rear jacks.

The sleeve 53 is then rotated in the suitable direction for operating the selected jacks, the worm shaft and worm rotating with the sleeve and in turn causing rotation of the worm gear and the shaft section 24 or 25 which may be in clutched relation therewith, for example, the shaft section 25 comprising the inner end of the front shaft 15. As will be evident, rotation of either shaft 14 or 15 will effect operation of the respective front or rear jacks to raise or lower the corresponding end of the vehicle.

The actuation of the worm 50 above described may be effected manually by inserting the crank 87 in the gear 90 and turning the crank 87, or by operating the switch to energize the motor.

Attention is called to the means for rotating the worm shaft, including the sleeve 53, whereby the motor shaft may be inserted in the sleeve for keying the worm shaft to the armature of the motor, and a supplemental pinion may be connected with the worm shaft for manual operation of the jacks.

What I claim and desire to secure by Letters Patent is:

1. In apparatus of the character described, a housing comprising separable sections having pairs of aligned openings, means for connecting the sections, aligned shafts rotatably mounted in one of said pairs of openings, a gear rotatably supported on adjacent ends of the shafts, and having clutch engaging means on its opposite faces, clutch members slidably fixed on the respective shafts for selective engagement with said gear, a bar extending parallel to said shafts and slidably mounted in the other pair of aligned openings, clutch actuating arms fixed on said bar and engageable with said clutch members, a rotary member journaled in the housing on a line of connection of the housing sections, and an eccentric pin associated with said rotatable member and engaging said bar to longitudinally shift the bar for selectively operating said clutch members.

2. In apparatus of the character described, a housing comprising separable sections having pairs of aligned openings, means for connecting the sections, aligned shafts rotatably mounted in one of said pairs of openings and having reduced adjacent ends, a sleeve on said reduced ends for coupling the shafts, a gear rotatably mounted on the sleeve and having clutch engaging means on its opposite faces, clutch members slidably fixed on the respective shafts for selective engagement with said gear, a bar slidably mounted in the other pair of aligned openings and having an elongated slot, clutch operating members fixed to said bar and engageable with said clutch members, a rotatable member journaled in the housing on a line of connection of the housing sections, and an eccentric pin associated with said rotatable member and engaged in said slot for shifting the bar to selectively actuate the clutch members.

CLARENCE E. WILLIAMS.